Feb. 8, 1949.   H. T. PENTECOST   2,461,347
HELICOPTER ADAPTED TO BE ATTACHED TO A PILOT
Filed Oct. 17, 1945   2 Sheets-Sheet 2
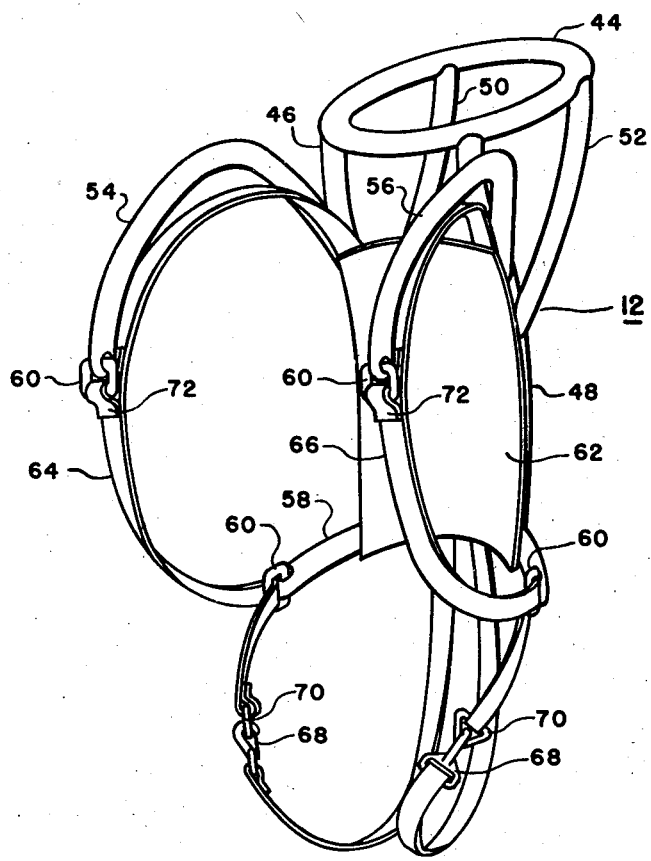
FIG_ 2
HORACE T. PENTECOST
*INVENTOR.*
BY Patented Feb. 8, 1949

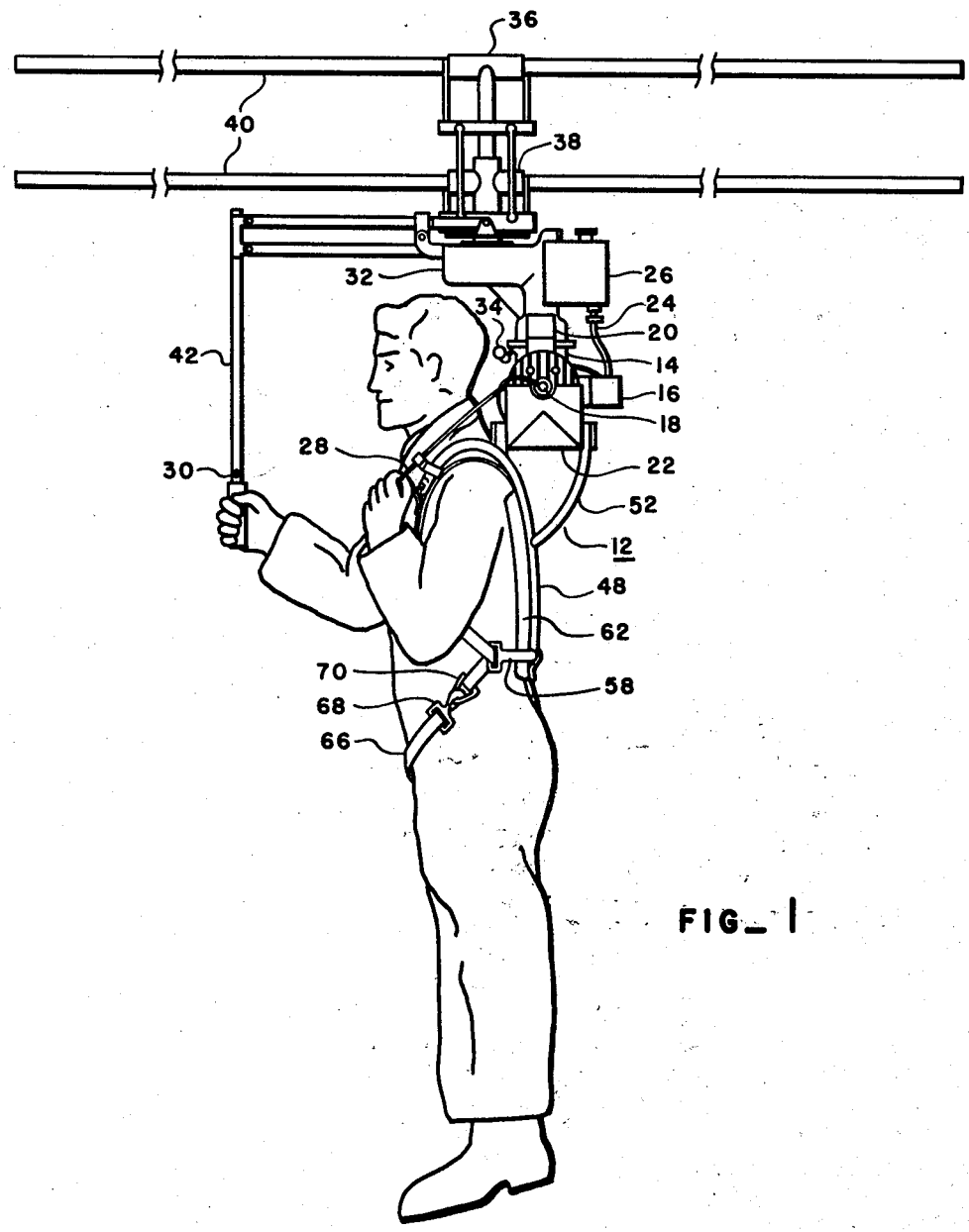

2,461,347

UNITED STATES PATENT OFFICE 2,461,347

HELICOPTER ADAPTED TO BE ATTACHED TO A PILOT

Horace T. Pentecost, Renton, near Seattle, Wash.

Application October 17, 1945, Serial No. 622,726

3 Claims. (Cl. 244—4)

This invention relates to an aircraft and, more particularly, to an aircraft of the helicopter type designed to support in the air, and be supported on the ground by, the operator or pilot.

An important object of the invention is to provide, in an aircraft, an arrangement of elements capable of being intimately associated with the operator so that in flight and on the ground the one supports the other without discomfort or material interference of other activities of the operator.

Another object of the invention is the provision, in a helicopter, of a harness and frame assembly, easily and simply constructed and readily attachable to the pilot.

A further object of the invention is to provide such a harness and frame which is safe and light, yet rigid and strong, and capable of inexpensive, uncomplicated forming and assembly.

Still another object of the invention is the provision of a harness and frame that in use applies pressure to the user only by means of the flexible harness and without actual bodily contact with the frame elements.

The foregoing objects and others ancillary thereto I prefer to accomplish as follows:

A small helicopter of the coaxial counter-rotary blade type is used to furnish the lifting means. Attached to it are a pair of juxtapositioned posts which lie along the back of the pilot. Hooks are provided at the upper end of these posts to extend over his shoulders and a curved crossbar it attached to their lower ends which fits around the small of his back. A back-pad carried by these posts and crossbar fit against his body as do two straps extending between the top and bottom edges of the back-pads. These straps are slidably associated with the cross bar and immovably coupled with the ends of the hooks. An engine, supported by the posts, furnishes power and rotation to the coaxial counter-rotary blades. The flight characteristics of these blades are controlled by means which are positioned in front of and conveniently operable by the pilot. Such an arrangement permits the pilot to perform such functions during flight as observation, communication and so forth.

The novel features that I consider characteristic of my invention are set forth with particularity in the appended claims. The invention itself, however, both as to its organization and its method of operation, together with additional objects and advantages thereof, will best be understood from the following description of a specific embodiment when read in connection with the accompanying drawings, in which:

Figure 1 is a side elevation of a small helicopter embodying my invention; and

Figure 2 is a perspective view of the harness and support means thereof.

Referring in detail to the drawing in which one form of the invention is illustrated, the aircraft comprises a frame and harness assembly 12, which is adapted to support the pilot in a suitable position during flight, and adapted to support the helicopter mechanism on the pilot's body while said mechanism is not airborne.

Comprising the aircraft and rigidly attached to the frame and harness assembly 12 is an engine 14, including carburetor 16, spark plug 18, exhaust stacks 20, air-cooling baffle and casing 22, fuel line 24, and fuel tank 26. One form of engine which may be used to furnish power for sustaining flight of the craft is of the internal combustion two-stroke, two cylinder opposed-piston type. It is forced air-cooled by means of paddles attached to the flywheel, which also houses the magneto. Starting may be by means of a rope knotted at one end and wrapped around the flywheel in the same manner as is customary with outboard type marine motors. The flywheel is preferably mounted on the underside of the engine, with the crankshaft axis upright and the power end of the shaft at the top of the engine. Throttle 28 may be attached directly to carburetor 16 for manual control, or an inertia type throttle governing device may be used to maintain constant engine speed with the manual throttle 28 serving as an over-ride control for use when emergency power is required, or other unusual operating requirements dictate its use. Switch button 30 shorts the primary circuit of the engine magneto system and may be conveniently located on the flight control element where the operator may quickly stop the engine by depressing the button with his thumb.

Further comprising the aircraft, and fitted to the upper end of the engine 14, is a transmission 32. The function of the transmission, more fully described in my co-pending application, Serial No. 622,727, filed October 17, 1945, is to furnish means for converting and dividing engine torque between two coaxial counter-rotating rotor hubs 36 and 38, as well as furnishing (a) means for manually disengaging all engine power and rotation from being transmitted to the rotors, (b) means for automatically limiting the transmission of torque through the system to the single or one way route from the engine power end to the rotors and (c) means for positioning the center of gravity of the machine and operator below and concentric with the axis of the rotor shafts. Clutch lever 34 is provided to allow the operator to manually disengage the engine from the remainder of the system, this operation being necessary to allow engine starting.

Attached to each hub 36 and 38, and also comprising the aircraft, are pairs of rotor blades 40. These may be of the size and configuration most advantageous in obtaining maximum performance and greatest economy for the craft as determined by aerodynamic and power calculations. A blade may be selected with a symmetrical airfoil section and a center of pressure which falls approximately at the quarter chord point. A blade is hinged to its rotor hub so that it may rotate about a longitudinal axis coinciding with the blade's center of pressure axis or at a point quarter distant between leading and trailing edge. Very little force then is required to change the relative angle of attack throughout a sufficiently wide range to encompass both the maximum and minimum angles normal to helicopter rotor blade operation in flight. For this reason, the pilot is permitted to directly and manually control the blade angles during flight without undue effort.

The mechanism required to position and maintain the blade angles necessary for controlled flight, more fully described in my co-pending application, Serial No. 621,254, filed October 9, 1945, then comprises and completes the aircraft selected to illustrate my invention.

A control handle 42 is movable by the pilot in any direction he wishes the craft to fly. It may be moved up or down, the result being a simultaneous increase or decrease in the angle of attack or pitch of all rotor blades. With an upward push of the control handle 42 and an increase in blade angle, together with an increase in engine power either by manual or automatic adjustment of the throttle 28, the craft will climb. By pushing the control handle 42 forward, the blades of both the upper and lower rotors may be cyclically pitched in such a manner as to create an unbalanced total lift and resultant thrust to the craft in a forward direction. A motion of the control handle, in fact, in any direction away from its normal position parallel to the axis of the coaxial rotor shafts results in a lateral thrust to the craft toward that direction. By axially twisting the control handle 42, the pitch of the blades of one rotor may be changed relative to the pitch of the blades of the other rotor, thereby upsetting the torque balance between the counter-rotary elements and resulting in the craft itself rotating about the axis of the coaxial rotor shafts. A twist then of the control handle either to the right or left results in the craft rotating to the right or left, and completes in a single manually operable element the control means necessary to operate the craft in flight.

Referring to Figure 2 which details the relationship of parts of the frame and harness assembly 12, and which concerns my invention more specifically, engine support ring 44 furnishes means by which the mechanically operable mechanism, thus far described, is secured to the frame and harness assembly 12. Also composing the frame and harness assembly 12 are vertical back posts or tubes 46 and 48 which, together with braces 50 and 52, carry the weight or lift of the flying mechanism to shoulder hooks 54 and 56, and to crossbar 58. These members are positioned as illustrated and are all rigidly connected to one another. Attached to the extremities of elements 54, 56 and 58 are links or D-rings 60. Supported between the vertical posts 46, 48 and the crossbar 58 is a fabric back piece 62 to which, in turn, is attached fabric straps 64, 66. These straps extend between the top and bottom of the fabric back piece 62 and are divided to allow the inclusion of snap hook 68 and eye link or ring 70 for the pilot's ease in attaching or detaching the flying equipment.

The fabric straps 64, 66, are slidably laced through links 60 at the extremities of the crossbar 58, but are restrained at D-rings 60 by cleats 72. These cleats are positioned on, and attached to, the fabric straps 64, 66 at such a point along the latter's length as to insure only fabric contact at the pilot's shoulders. That is, the shoulder hooks 54 and 56 are held suspended away from his shoulders due to the tension of the fabric straps 64, 66 between the links 60 at the extremities of shoulder tubes 54, 56 and the fabric back piece 62 secured to the vertical back tubes 46, 48. This feature allows the transfer of the weight of the non-airborne machine to the pilot's shoulders with a minimum of discomfort.

The lower loops of the fabric straps 64, 66 extend down the pilot's back from their fastenings at the fabric back piece 62, forward between his legs and upward across his groin where may be located the snap hooks 68 and eye links 70. The straps then continue upward and backward through links 60 at the extremities of the crossbar 58, and then forward and upward across the pilot's chest to be secured by cleats 72 to links 60 at the extremities of the shoulder tubes 54, 56. Simple adjusting means may be included at some convenient point in the length of fabric straps 64, 66 between their attachment points at the lower part of fabric back piece 62 and cleats 72 so as to make the harness adaptable to pilots of various sizes. The tension, then, of the fabric straps 64, 66 about the pilot's body may be sufficient to keep the machine properly aligned upon his shoulders while it is idle. When the machine is operating and producing lift through the tubular structure of the frame and harness assembly 12, this lift is then transmitted to the pilot's body by the lower loops of the fabric straps 64, 66, while the entire harness portion of the frame and harness assembly 12 is keeping his body in proper and relatively comfortable alignment in respect to the craft and the controls thereof.

Although I have shown and described certain specific embodiments of my invention, I am fully aware that many modifications thereof are possible. My invention, therefore, is not to be restricted except insofar as is necessitated by the prior art and by the spirit of the appended claims, as follows.

I claim:

1. In a helicopter, a pair of juxtaposed posts to lie along the back of a pilot and having hooks thereon to extend over his shoulders, a lower arcuate crossbar on said posts, a back-pad carried by said posts below the hooks thereon, straps extending between the top and bottom edges of said back-pad, each said strap being slidably associated with the crossbar and immovably coupled with a hook, coaxial lifting rotors having changeable-pitch blades carried by and above said posts in fixed relationship thereto, an engine for driving said rotors, and means for varying the pitch of said blades, including means positioned in front of and conveniently operable by the pilot.

2. In a helicopter, a pair of juxtaposed posts to lie along the back of a pilot and having hooks thereon to extend over his shoulders, a lower arcuate crossbar on said posts, a back-pad carried by said posts below the hooks thereon, straps extending between the top and bottom edges of said back-pad, each said strap being slidably associated with the crossbar and immovably coupled with a hook, said strap non-resiliently spanning the space between the hook and its attachment to the back-pad, coaxial lifting rotors having changeable-pitch blades carried by and above said posts in fixed relationship thereto, an engine for driving said rotors, and means for varying the pitch of said blades including means positioned in front of and conveniently operable by the pilot.

3. In a helicopter, a pair of juxtaposed posts to lie along the back of a pilot and having hooks thereon to extend over his shoulders, a lower arcuate crossbar on said posts having guide loops thereon, a back-pad carried by said posts below the hooks thereon, divisible straps extending between the top and bottom edges of said back-pad, each said strap being slidably associated with a guide loop of the crossbar and immovably coupled with a hook, coaxial lifting rotors having changeable-pitch blades carried by and above said posts in fixed relationship thereto, an engine for driving said rotors, and means for varying the pitch of said blades including means positioned in front of and conveniently operable by the pilot.

HORACE T. PENTECOST.

REFERENCES CITED

The following references are of record in the file of this patent:

UNITED STATES PATENTS

| Number | Name | Date |
|---|---|---|
| 1,228,227 | Melniczak | May 29, 1917 |
| 2,092,077 | Knight et al. | Sept. 7, 1937 |
| 2,141,041 | Knight | Dec. 20, 1938 |
| 2,155,426 | Larsen | Apr. 25, 1939 |
| 2,180,922 | DeBothezat | Nov. 21, 1939 |
| 2,192,881 | DeBothezat | Mar. 12, 1940 |
| 2,352,342 | Pitcairn | June 27, 1944 |
| 2,440,295 | Synnestvedt | Apr. 27, 1948 |